United States Patent
Shin et al.

(10) Patent No.: US 9,449,423 B2
(45) Date of Patent: Sep. 20, 2016

(54) APPARATUS AND METHOD FOR IMAGE PROCESSING

(71) Applicant: Samsung Electronics Co., Ltd., Suwon-si, Gyeonggi-do (KR)

(72) Inventors: Young Sam Shin, Hwaseong-si (KR); Seung Won Lee, Hwaseong-si (KR); Shi Hwa Lee, Seoul (KR); Won Jong Lee, Seoul (KR); Jae Don Lee, Yongin-si (KR); Seok Yoon Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 657 days.

(21) Appl. No.: 13/871,385

(22) Filed: Apr. 26, 2013

(65) Prior Publication Data

US 2014/0104271 A1    Apr. 17, 2014

(30) Foreign Application Priority Data

Oct. 16, 2012 (KR) .......................... 10-2012-0114806

(51) Int. Cl.
*G06T 15/06* (2011.01)

(52) U.S. Cl.
CPC ..................................... *G06T 15/06* (2013.01)

(58) Field of Classification Search
None
See application file for complete search history.

(56) References Cited

U.S. PATENT DOCUMENTS

2008/0088619 A1*  4/2008  Shearer ................... G06T 15/06
                                                     345/420

FOREIGN PATENT DOCUMENTS

| KR | 10-2008-0052328 | 6/2008 |
| KR | 10-2010-0065060 | 6/2010 |
| KR | 10-2010-0094532 | 8/2010 |
| KR | 10-2010-0128493 | 12/2010 |
| KR | 10-2012-0032159 | 4/2012 |
| KR | 10-2012-0033585 | 4/2012 |

* cited by examiner

*Primary Examiner* — Said Broome
(74) *Attorney, Agent, or Firm* — NSIP Law

(57) ABSTRACT

A method for processing a three-dimensional (3D) image of a ray tracing scheme may be performed by an image processing apparatus by verifying whether local index information matching intersection point information of a ray is present within a prefetch table when intersection point information is received, and by transferring, to a shader, rendering information stored in a local memory based on the local index information, when the local index information matching the intersection point information is present.

21 Claims, 8 Drawing Sheets

APPARATUS AND METHOD FOR IMAGE PROCESSING

CROSS-REFERENCE TO RELATED APPLICATIONS

This application claims the priority benefit of Korean Patent Application No. 10-2012-0114806, filed on Oct. 16, 2012, in the Korean Intellectual Property Office, the disclosure of which is incorporated herein by reference.

BACKGROUND

1. Field

One or more embodiments relate to a method and apparatus for processing a three-dimensional (3D) image of a ray tracing scheme.

2. Description of the Related Art

Three-dimensional (3D) image rendering technology refers to a technology of synthesizing 3D object data into an image observed from a viewpoint of a camera.

Rendering technology may include a rasterization scheme of creating an image by projecting a 3D object on a screen and a ray tracing scheme of creating an image by tracing a path of light incident along the ray towards each pixel of an image from a viewpoint of a camera.

The ray tracing scheme may create a high quality image using a physical property of light, but may not perform rendering at a high rate due to a relatively large amount of calculation.

SUMMARY

The foregoing and/or other aspects are achieved by providing an image processing apparatus, including a traversal unit to verify whether local index information matching intersection point information of a ray is present within a prefetch table when the intersection point information is received, and a controller to transfer, to a shader, rendering information stored in a local memory based on the local index information, when the local index information matching the intersection point information is present.

The traversal unit may verify whether local index information matching global index information of a point at which the ray and a polygon of an object intersect is present within the prefetch table.

The controller may include a table generator to generate the prefetch table in which the global index information and the local index information matches, and a table updater to update the prefetch table with new global index information not reflected in the prefetch table and new local index information matching the new global index information. The local index information may indicate an index of the local memory that stores rendering information prefetched from a global memory based on the global index information.

The controller may include a packet generator to generate a packet including at least one of local index information matching intersection point information for the respective rays intersecting a polygon of an object and local memory addresses corresponding to the local index information.

The local memory may store rendering information that is prefetched from a global memory to a local memory address of the local memory for the respective packets.

A size of the packet may be determined based on a size of the local memory and a hit rate of the ray.

The controller may include a converter to convert global index information corresponding to the intersection point information to a global memory address of a global memory, and to convert, to a local memory address of the local memory, local index information that matches the global index information in the prefetch table, and a prefetcher to prefetch, to the local memory address of the local memory, rendering information stored in the global memory address of the global memory.

A size of the prefetch table may be determined based on a size of the local memory and a hit rate between the ray and a polygon of an object.

The controller may adjust a size of a packet based on a recursive pattern of global index information.

The local memory may store primitive information and texture information matching local index information for the respective packets.

When the local index information matching the intersection point information is present, the controller may transfer, to the shader, the local index information and a local memory address corresponding to the local index information.

The foregoing and/or other aspects are achieved by providing an image processing method, including verifying whether local index information matching intersection point information of a ray is present within a prefetch table when the intersection point information is received, and transferring, to a shader, rendering information stored in a local memory based on the local index information, when the local index information matching the intersection point information is present.

The verifying may include verifying whether local index information matching global index information of a point at which the ray and a polygon of an object intersect is present within the prefetch table.

The image processing method may further include generating the prefetch table in which the global index information and the local index information of the local memory storing rendering information prefetched from a global memory matches, and updating the prefetch table with new global index information not reflected in the prefetch table and new local index information matching the new global index information.

The image processing method may further include generating a packet including local index information matching intersection point information for the respective rays intersecting a polygon of an object.

The image processing method may further include converting global index information corresponding to the intersection point information to a global memory address of a global memory, and converting, to a local memory address of the local memory, local index information that matches the global index information in the prefetch table, and prefetching, to the local memory address of the local memory, rendering information stored in the global memory address of the global memory.

The foregoing and/or other aspects are achieved by providing an image processing method, including determining whether rendering information corresponding to intersection point information of a ray is stored in a local memory, by referring to a prefetch table, transferring rendering information stored in the local memory when the prefetch table indicates at least some rendering information corresponding to the intersection point information is stored in the local memory, prefetching from a global memory to the local memory rendering information corresponding to the intersection point information when the prefetch table indicates at least some rendering information corresponding to the intersection point information is not stored in the local memory; and updating the prefetch table to reflect that the local memory stores the rendering information prefetched from the global memory.

The prefetch table may be referred to verify whether a global index associated with the intersection point information matches a reference address of a local index corresponding to the local memory.

The packet may be generated to include local index information corresponding to the prefetched rendering information. The packet may be generated by grouping a plurality of items according to a local index type. The size of the generated packet may be determined according to a differentiated method according to at least one of a ray strength of an intersecting ray, a recursion depth according to ray tracing, an amount of time used to render a current frame, and an available resource of a system.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
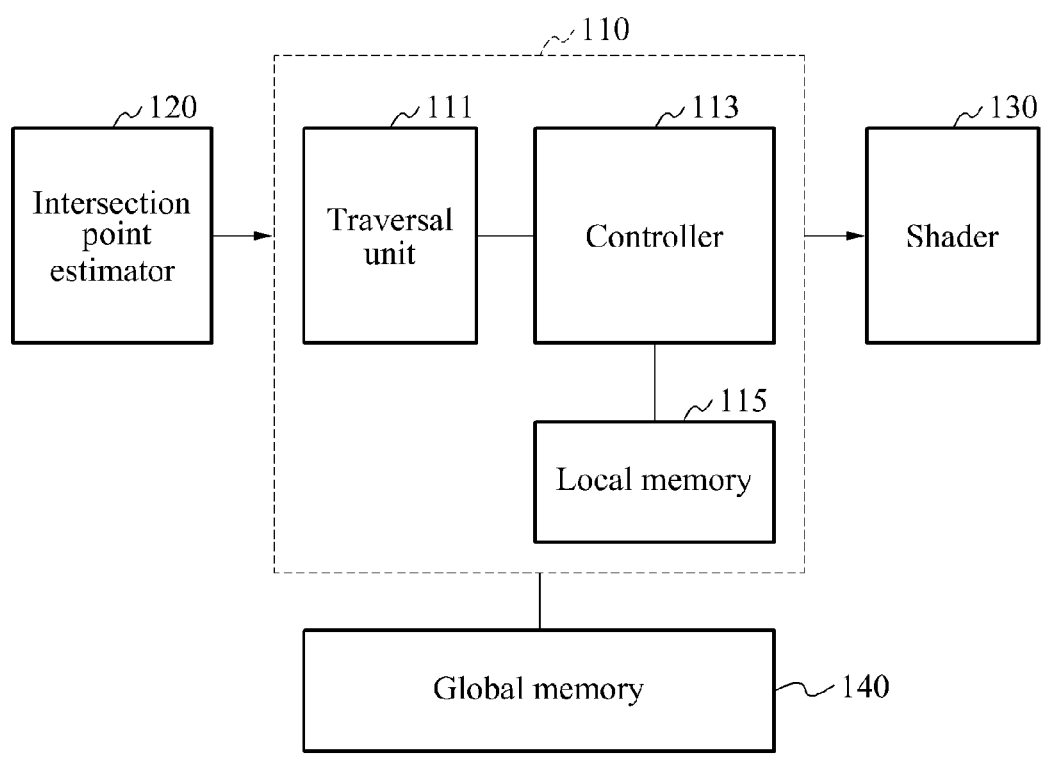
FIG. 1 illustrates an image processing apparatus according to an embodiment.

Reference will now be made in detail to embodiments, examples of which are illustrated in the accompanying drawings, wherein like reference numerals refer to like elements throughout. Embodiments are described below to explain the present disclosure by referring to the figures.

In a ray tracing scheme, traversal of an acceleration structure in which objects to be rendered are spatially divided and an intersection test between a ray and a primitive may be performed.

A process for the traversal and the intersection test may be a process of employing at least 70% of calculation and occupying at least 90% of memory bandwidth to the entire process of the ray tracing scheme, and may be processed using dedicated hardware for real-time processing. That is, the process for the traversal and the intersection test may require a significant amount of processing power relative to other processes performed in a ray tracing scheme, and a significant amount of the memory may be required relative to other processes which are performed in a ray tracing scheme.

A ray that passes the traversal and the intersection test may undergo a shading and ray generation (SRG) process of calculating a color of a pixel at an intersection point and calculating a level of reflection, refraction, and transmission of a new ray occurring at the intersection point.

Rendering information may be required to perform SRG based on intersection point information. The rendering information may include, for example, color information and texture information. In general, the rendering information may be stored in a shared memory. A synchronous dynamic random access memory (SDRAM) may be generally used for the shared memory. In the case of using the SDRAM, a stall of a processor may occur due to latency and data load.

FIG. 1 illustrates an image processing apparatus 110 according to an embodiment. The image processing apparatus 110 may prevent a stall of the processor experienced in conventional SRG processes, by using a local memory 115 in conjunction with global memory 140 for example.

Referring to FIG. 1, the image processing apparatus 110 may include a traversal unit 111, a controller 113, and a local memory 115. The image processing apparatus 110 may further include an intersection point estimator 120, a shader 130, and a global memory 140.

The traversal unit 111 may verify whether local index information matching intersection point information of a ray is present within a prefetch table when the intersection point information is received. Intersection point information of a ray may include an index of an intersecting ray, information associated with a pixel that the ray intersects, and global index information of the pixel. The intersection point information may be obtained from the intersection point estimator 120. Global index information may indicate a pixel index predetermined for each pixel.

The intersection point estimator 120 may obtain intersection point information by performing a traversal and an intersection test between a ray and a primitive. A primitive may be embodied as a geometric shape. For example the primitive may be a polygon, a sphere, half-sphere, cylinder-shaped, a cube, a triangle, etc. The intersection point estimator 120 may obtain intersection point information by performing a traversal and an intersection test generally employed in a ray tracing field.

The prefetch table may refer to a table in which intersection point information and local index information matches. The intersection point information will be described by employing global index information as an example. The global index information may be converted to local index information by the controller 113. The traversal unit 111 may verify global index information from intersection point information of a ray, and may verify whether local index information matching the verified global index information is stored in the prefetch table.

When local index information matching intersection point information is present, the controller 113 may transfer, to the shader 130, rendering information stored in the local memory 115 based on the local index information. Rendering information may include, for example, color information and texture information. Information such as position, hue, saturation, brightness, and contrast information may be modified by the shader 130 to produce an effect. The controller 113 may transfer, to the shader 130, rendering information stored in the local memory 115, without a need to access the global memory 140. Accordingly, collision and latency occurring due to the access to the global memory 140 may be absent.

The local memory 115 may store rendering information in a local memory address corresponding to local index information. Rendering information stored in the local memory 115 may be rendering information that is prefetched from the global memory 140 to the local memory address based on global index information. The local memory 115 may be an internal memory that generally stores rendering information which is prefetched. For example, the local memory 115 may be a cache. The local memory 115 may be relatively smaller in size than the global memory 140.

When local index information matching intersection point information is absent, the controller 113 may generate new local index information by converting the intersection point information. For example, the controller 113 may convert global index information to local index information.

The global memory 140 may store rendering information in a global memory address corresponding to global index information. The global memory 140 may indicate a shared memory. The controller 113 may prefetch rendering information matching global index information and may match the prefetched rendering information and local index information, thereby storing the rendering information in the local memory 115. Here, global index information and local index information indicating the same rendering information may match and thereby, be stored in the prefetch table. For example, the controller 113 may update the prefetch table with global index information and local index information indicating the same rendering information.

A size of the prefetch table may be determined based on a size of the local memory 115 and a hit rate between a ray and a polygon of an object. The object may indicate a target to be rendered, and the polygon may correspond to a smallest unit of an acceleration structure in which the object is spatially divided. The polygon may be triangular or rectangular in shape for example, or another geometric shape. The hit rate may indicate a probability that a ray intersects the same polygon. More specifically, the hit rate may indicate a frequency that the controller 113 loads the same information stored in the local memory 115. Thus, a higher hit rate may result the more often the controller 113 loads the same information.

The size of the prefetch table may be in proportion to a size of the local memory 115 and in an inverse proportion to the hit rate. For example, when the size of the local memory 115 increases, the size of the prefetch table may also increase. When the hit rate increases, the size of the prefetch table may decrease. That is, the higher the probability that a ray intersects a same polygon, the higher the hit rate, and the size of the prefetch table may be smaller. The prefetch table may be stored in the local memory 115.

The traversal unit 111 may verify or determine whether local index information matching global index information of a point at which a ray and a polygon of an object intersects is present within the prefetch table. When the matching local index information is present, the controller 113 may obtain rendering information from the local memory 115 based on the local index information and may transfer the rendering information to the shader 130.

The local memory 115 may store, for each packet, rendering information that is prefetched from the global memory 140 to a local memory address of the local memory 115. The local memory address may be converted from local index information.

The controller 113 may generate a packet by grouping a predetermined number of items of local index information. The controller 113 may store, in the local memory 115, rendering information that is prefetched based on a packet unit.

A size of the packet may be determined based on the size of the local memory 115 and a hit rate of the ray. As described above, the hit rate of the ray may indicate a probability that the ray intersects the same polygon. For example, the size of the packet may increase (e.g., include a relatively higher number of items or have an increased memory size) when the hit rate of the ray is relatively lower and the size of the local memory is relatively larger. The size of the packet may decrease (e.g., include a relatively smaller number of items or have a decreased memory size) when the hit rate of the ray is relatively higher and the size of the local memory is relatively smaller.

The local memory 115 may include primitive information and texture information that matches local index information, for each packet. The primitive information may indicate a basic form of the object that the ray intersects. For example, the primitive information may be a polygon.

The intersection point estimator 120 may obtain intersection point information by performing a traversal and an intersection test between a ray and a primitive.

The shader 130 may receive, from the controller 113, rendering information stored in the local memory 115, and may perform an SRG process. Alternatively, the shader 130 may receive, from the controller 113, local index information of the local memory 115 that stores rendering information, and may obtain the rendering information by accessing the local memory 115. The shader 130 may perform the SRG process using the obtained rendering information.

The controller 113 may adjust the size of the packet based on a recursive pattern of global index information. The controller 113 may detect a recursive pattern of global index information from global index information corresponding to the received intersection point information. The controller 113 may adjust the size of the packet based on a recursion interval of the detected recursive pattern. For example, when the recursion interval is long, the controller 113 may relatively further increase the size of the packet compared to a case in which the recursive interval is short. For example, the size of the packet may increase (e.g., include a relatively higher number of items or have an increased memory size) when the recursive interval (e.g., the duration of the pattern interval is relatively longer. Alternatively, if the recursive pattern of global index information comprises global index information of a relatively larger size then the size of the packet may be increased.

When local index information matching intersection point information is present, the controller 113 may transfer, to the shader 130, the local index information and a local memory address corresponding to the local index information.

The controller 113 may perform an overall control of the image processing apparatus 111, and may perform functionality of any of the intersection point 120, the traversal unit 111, and the shader 130. Constituent elements are separately configured in FIG. 1 to distinguishably explain functions of the respective constituent elements. Accordingly, when configuring an actual product, all of the constituent elements may be configured to be processed in the controller 113 or only a portion of the constituent elements may be configured to be processed in the controller 113.

Figure 2:
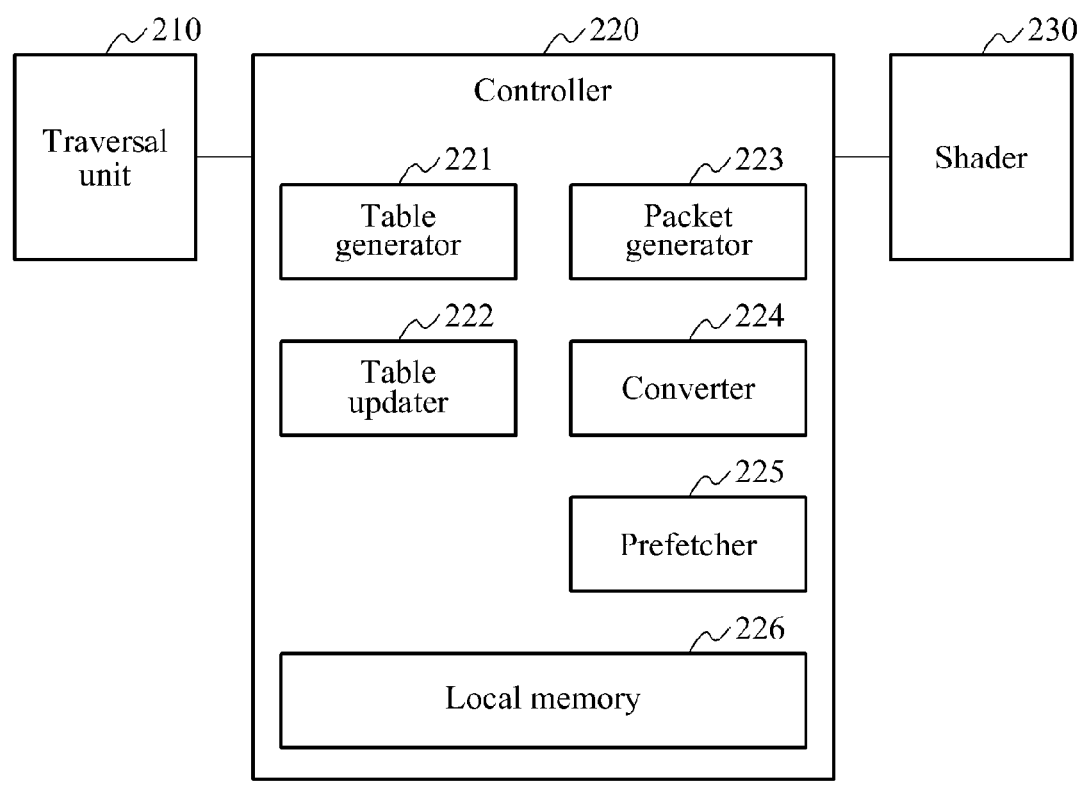
FIG. 2 illustrates an image processing apparatus according to another embodiment.

FIG. 2 illustrates an image processing apparatus according to another embodiment.

Referring to FIG. 2, the image processing apparatus may include a traversal unit 210, a controller 220, and a shader 230.

The traversal unit 210 may verify whether local index information matching intersection point information of a ray is present within a prefetch table when the intersection point information is received. Intersection point information of a ray may include information associated with an index of the intersecting ray and a pixel that the ray intersects, and global index information of the pixel.

The prefetch table may refer to a table in which intersection point information and local index information matches. The intersection point information will be described by employing global index information as an example. The global index information may be converted to the local index information by a converter 224. The traversal unit 210 may verify global index information from intersection point information of a ray, and may verify whether local index information matching the verified global index information is stored in the prefetch table.

When local index information matching intersection point information is present, the controller 220 may transfer, to the shader 230, rendering information stored in a local memory 226 based on local index information. Rendering information may include, for example, color information and texture information.

The controller 220 may determine local index information to match global index information. The controller 220 may determine a local memory address to be stored in the local memory 226 by prefetching rendering information stored in a global memory address from a global memory. Global index information may correspond to the global memory address, and local index information may correspond to the local memory address.

When local index information matching intersection point information is absent within the prefetch table, the controller 220 may determine new local index information to match intersection point information.

The shader 230 may receive, from the controller 220, rendering information stored in the local memory 226, and may perform an SRG process. Alternatively, the shader 230 may receive, from the controller 220, local index information of the local memory 226 that stores rendering information, and may obtain the rendering information by accessing the local memory 226. The shader 230 may perform an SRG process using the obtained rendering information.

The controller 220 may include a table generator 221, a table updater 222, a packet generator 223, the converter 224, a prefetcher 225, and the local memory 226.

The table generator 221 may generate a prefetch table in which global index information and local index information match.

The table updater 222 may update the prefetch table with new global index information not reflected in the prefetch table and new local index information matching the new global index information. That is, the prefetch table may be updated by adding global index information which matches local index information, which is not already present in the prefetch table. Alternatively, the prefetch table may be updated by removing, from the prefetch table, global index information which is determined not to match local index information. Further, the prefetch table may be updated in response to rendering information being transferred, overwritten, and/or deleted from the local memory.

The local index information indicates an index of the local memory 226 that stores rendering information prefetched from the global memory based on the global index information.

The packet generator 223 may generate a packet including at least one of local index information matching intersect point information for the respective rays intersecting a polygon of an object and local memory addresses corresponding to the local index information. The packet generator 223 may generate a packet by grouping a plurality of items of local index information.

The converter 224 may convert global index information corresponding to the intersection point information to a global memory address of the global memory, and to convert, to a local memory address of the local memory 226, local index information that matches the global index information in the prefetch table. The converter 224 may convert global index information to the global memory address based on a predetermined criterion, when the global index information is received, and may convert local index information to the local memory address based on a predetermined criterion when the local index information is received.

The prefetcher 225 may prefetch, to the local memory address of the local memory 226, rendering information stored in the global memory address of the global memory. The prefetcher 225 may obtain rendering information from the global memory based on the global memory address, and may store the obtained rendering information in the local memory address of the local memory 226.

The prefetcher 225 may prefetch, to the local memory 226, rendering information stored in the global memory based on a packet unit. The prefetcher 225 enables rendering information to be further quickly stored in the local memory 226 from the global memory by performing prefetching for each packet. That is, each packet may contain a plurality of items of local index information, and therefore rendering information corresponding to a plurality of local indices may be obtained and stored in respective local memory addresses of the local memory.

The local memory 226 may store, for each packet, rendering information that is prefetched from the global memory to the local memory address of the local memory 226.

A size of the packet may be determined based on a size of the local memory 226 and a hit rate of a ray. Here, the hit rate may indicate a probability that a ray intersects the same polygon. More specifically, the hit rate may indicate a frequency that the controller 220 loads the same information stored in the local memory 226. For example, the size of the packet may increase (e.g., include a relatively higher number of items or have an increased memory size) when the hit rate of the ray is relatively lower and the size of the local memory is relatively larger. The size of the packet may decrease (e.g., include a relatively smaller number of items or have a decreased memory size) when the hit rate of the ray is relatively higher and the size of the local memory is relatively smaller.

Figure 3:
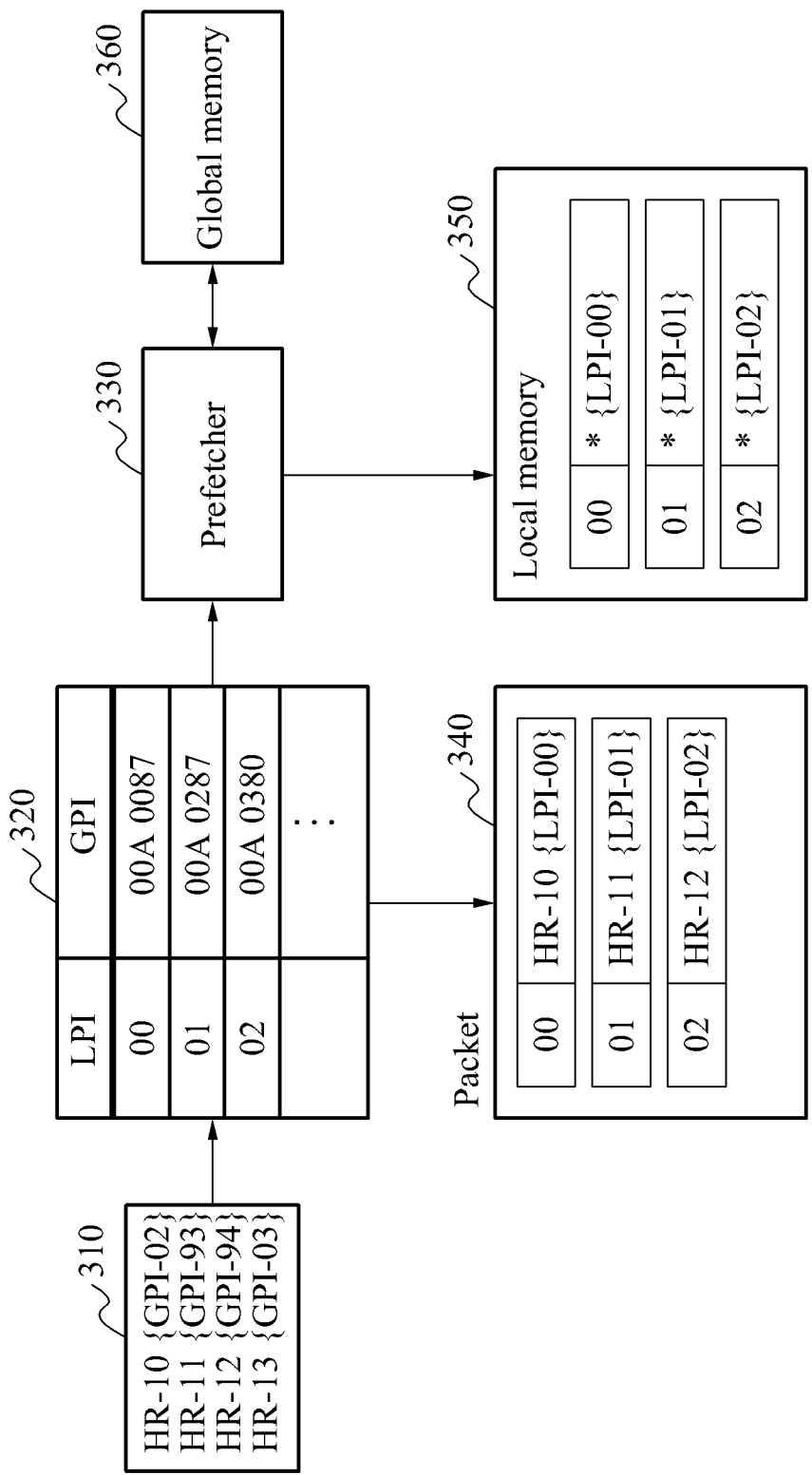
FIG. 3 illustrates a process of obtaining rendering information using a prefetch table based on a packet unit of an image processing apparatus according to an embodiment.

FIG. 3 illustrates a process of obtaining rendering information using a prefetch table based on a packet unit of an image processing apparatus according to an embodiment.

Referring to FIG. 3, the image processing apparatus may estimate intersection point information 310 of a ray. The intersection point information 310 may include information associated with an intersecting ray and global primitive index information associated with a polygon that the ray intersects. The global primitive index information may indicate an index of a space in which primitive information is stored in a global memory. For example, in the intersection point information 310, "HR-10" indicates that an index of an intersecting ray is "10", and "GPI-02" indicates that a global primitive index of a polygon that the ray of "HR-10" intersects is "02".

A prefetch table 320 may refer to a table in which a local primitive index (LPI) and a global primitive index (GPI) match. The prefetch table may be formatted such that the LPI is provided in decimal form and the GPI is provided in hexadecimal form. However, the disclosure is not so limited and the LPI and GPI may be stored in alternative forms, such as decimal, binary, hexadecimal, etc. Referring to the prefetch table 320, "GPI 00A 0087" matches "LPI 00". For example, when it is assumed that "00A 0087" corresponds to "GPI-02", the image processing apparatus may interpret a machine language of "00A 0087" as "GPI-02". The image processing apparatus may verify that "LPI 00" matches "GPI-02". Also, when it is assumed that "00A 00287" corresponds to "GPI-93" and "00A 0380" corresponds to "GPI-94", the image processing apparatus may verify that "GPI-93" matches "LPI 01" and "GPI-94" matches "LPI 02".

As shown in FIG. 3 for example, the image processing apparatus may generate a packet 340 by grouping three items ("LPI 00", "LPI 01", and "LPI 02"). The image processing apparatus may manage an LPI based on a packet unit. However, a packet may include more than or less than three items, and FIG. 3 merely provides one example of a packet.

The image processing apparatus may include a prefetcher 330. The prefetcher 330 may prefetch rendering information from a global memory 360 to a local memory 350 based on the LPI included in the packet 340. The prefetcher 330 may prefetch rendering information based on the packet unit. The prefetcher 330 may verify "GPI 00A 0087" from the prefetch table 320 based on "LPI-00" of the packet 340, and may obtain rendering information from the global memory 360 based on a global memory address converted from "GPI 00A 0087". The prefetcher 330 may store the obtained rendering information in an address of LPI-converted local memory.

Local memory addresses corresponding to "LPI-00", "LPI-01", and "LPI-02" may be indicated as "*{LPI-00}", "*{LPI-01}", and "*{LPI-02}", respectively.

The image processing apparatus may preload, from the global memory 360, data required for an SRG process based on intersection point information that is generated in a stream format. The image processing apparatus may store the data in the local memory 350. The image processing apparatus may perform an operation of grouping and packetizing a plurality of LPIs.

The image processing apparatus may generate a packet to have a length suitable for an operation of the SRG process. The packet may be generated by combining a plurality of LPIs in an array form.

Using the prefetch table 320, the image processing apparatus may obtain a global memory index from an index stored in the packet, and may determine an address of data to be prefetched, stored in the global memory 360, and a position of the data to be stored in the local memory 350.

The image processing apparatus may reuse data already stored in the local memory 350, instead of separately duplicating the data from the global memory 360.

Data configured based on a packet unit may be duplicated from the global memory 360 to the local memory 350 using a direct memory access (DMA) scheme. The prefetch table 320 may represent a matching relationship between a GPI and an LPI associated with data that is currently prefetched to the local memory 360.

The prefetch table 320 may store data based on an index of data required for an operation of the SRG process.

Prior to calculating a global memory address using a global index of an intersecting ray, the image processing apparatus may verify whether required rendering information is stored in the local memory 350 by referring to the prefetch table 320.

With respect to data already prefetched to the local memory 350, the image processing apparatus may perform an SRG process by obtaining rendering information from the local memory 350, instead of calculating a global memory address. That is, an unnecessary operation of calculating a global memory address may be avoided if it is determined that rendering information corresponding to an index of data is already stored in the local memory, based upon the contents of the prefetch table. For example, it may be determined from intersection point information received by the image processing apparatus that some of the data corresponding to the intersection point information is already prefetched and stored in the local memory. Therefore, only global memory addresses corresponding to data not already prefetched may be calculated.

Figure 4:
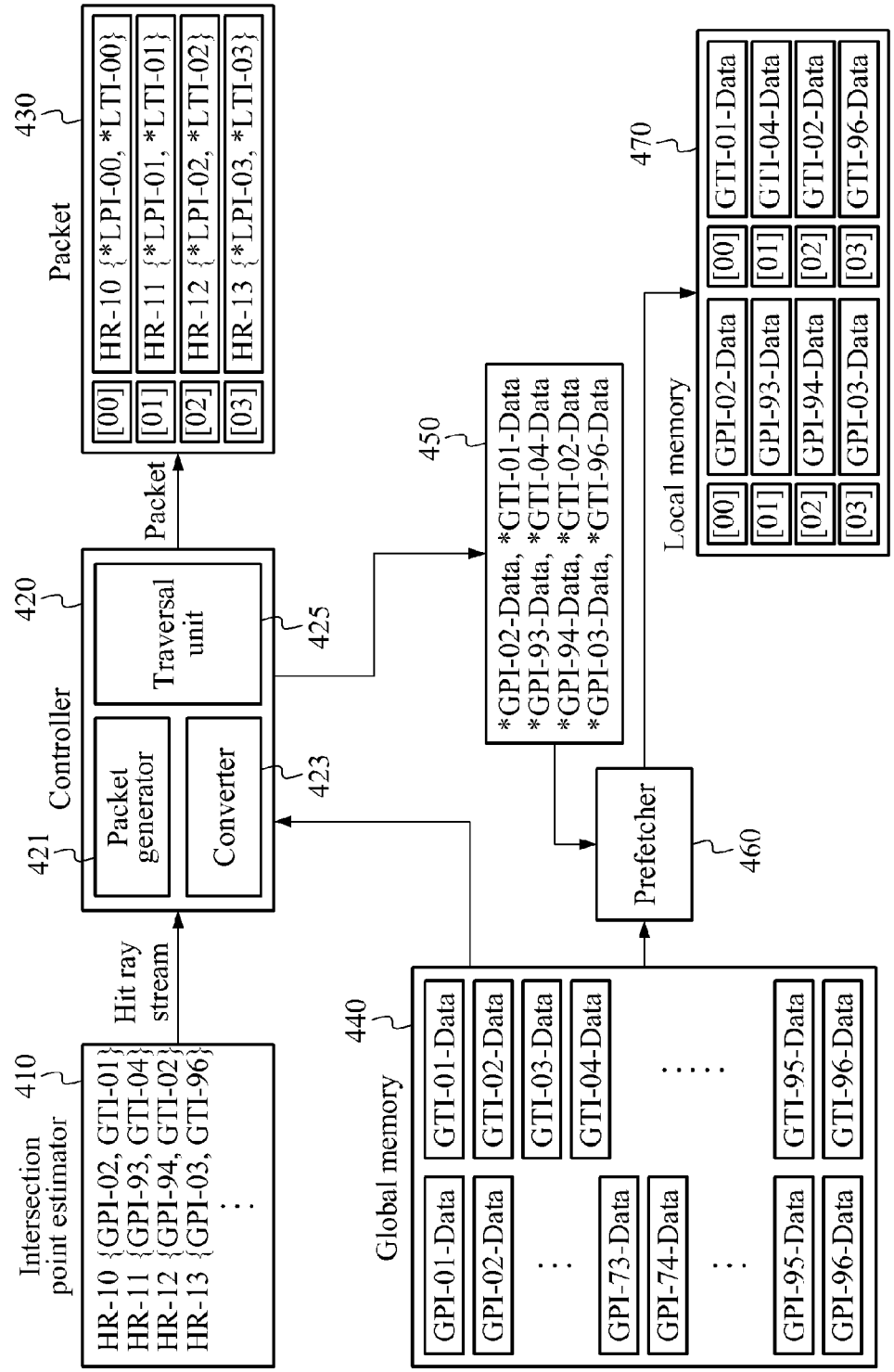
FIG. 4 and FIG. 5 illustrate an operation of an image processing apparatus according to an embodiment.
Figure 5:
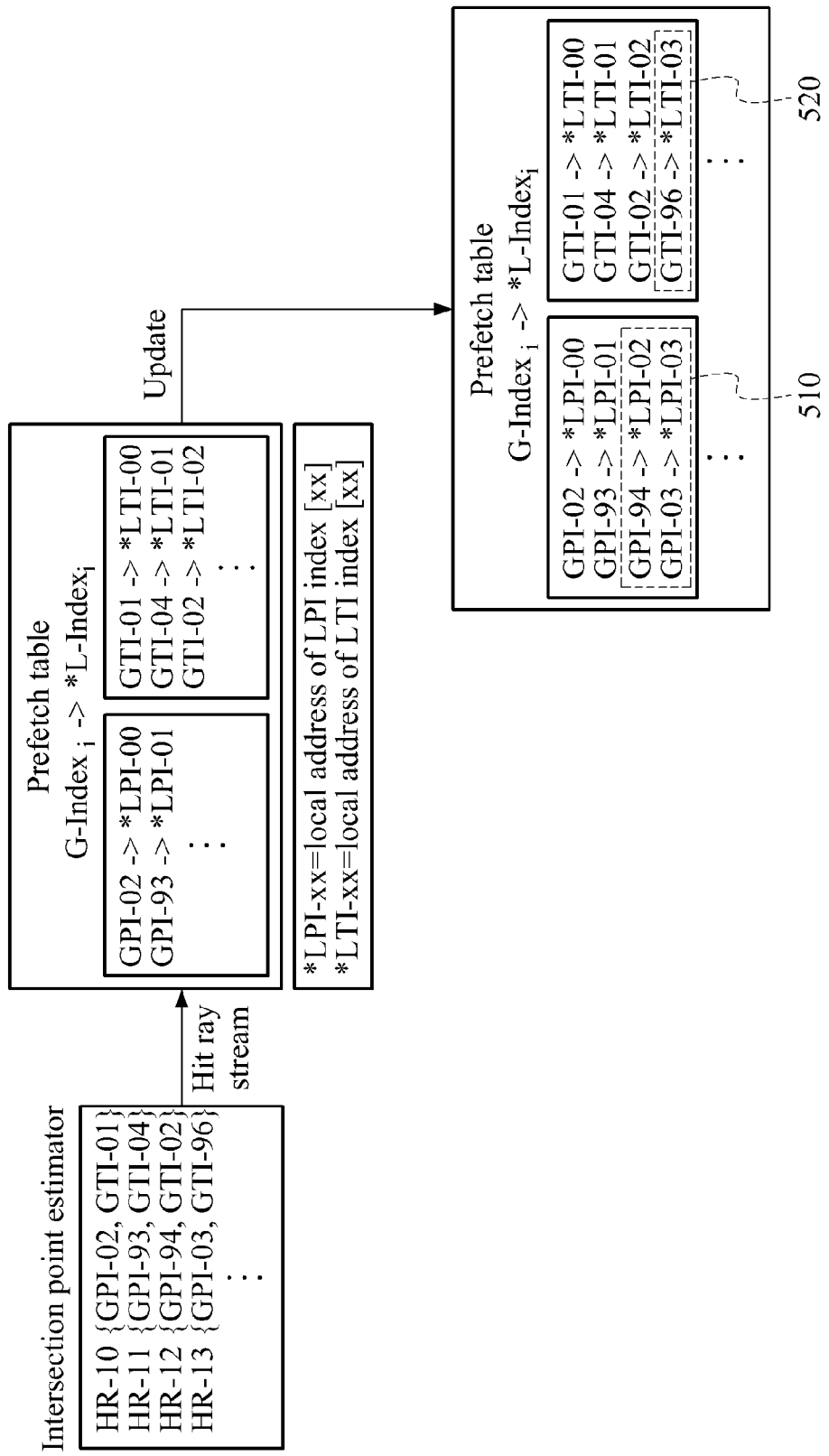

FIG. 4 and FIG. 5 illustrate an operation of an image processing apparatus according to an embodiment.

Referring to FIG. 4, the image processing apparatus may transfer a prefetched data packet 430 to an SRG processor.

FIG. 4 illustrates an example of prefetching, from a global memory 440 to a local memory 470, primitive data and texture data that is required for SRG.

A GPI indicates an index of a space in which primitive information is stored in the global memory 440. A global texture index (GTI) indicates an index of a space in which texture information is stored in the global memory 440. The image processing apparatus may calculate a systematically accessible global memory address using the GPI and the GTI.

For example, when a primitive index number is "01", data may be expressed as "GPI-01-Data". An actual memory address in which the above data is stored may be calculated by employing "GPI 01" as reference, and may be expressed as "*GPI-01-Data".

The image processing apparatus may load data from the global memory 440 based on an actual memory address, and may store the data in an address matching "GPI 01" of an area of a local memory 470. Here, a primitive index of the area of the local memory 470 may be referred to as a local primitive index (LPI). A texture index of the area of the local memory 470 may also be referred to as a local texture index (LTI).

When a primitive index number is "01", primitive data may be expressed as "LPI-01". Here, a local memory address may be expressed as "*LPI-01". When a texture index number is "01", texture data may be expressed as "LTI-01". Here, a local memory address may be expressed as "*LTI-01".

A prefetch table represents a matching relationship between a global index and a local index. The global index may include a GPI and a GTI, and the local index may include an LPI and an LTI.

For example, when data corresponding to "GPI-01" is prefetched and is already stored in an area of the local memory 470 corresponding to "LPI-01", "GPI-01→LPI-01" may be indicated in the prefetch table.

An intersection point estimator 410 may obtain intersection point information by performing a traversal and an intersection test between a ray and a primitive. Intersection point information may include information (HR) associated with an intersecting ray, a GPI of a polygon that the ray intersects, and a GTI of the polygon.

The intersection point estimator 410 may transfer intersection point information to a controller 420 in a stream format.

The controller 420 may include a packet generator 421, a converter 423, and a traversal unit 425.

The packet generator 421 may generate the packet 430 by grouping information associated with a plurality of rays to be prefetched, GPIs, and GTIs. The packet generator 421 may generate the packet 430 by grouping information associated with a plurality of rays to be prefetched, LPIs, and LTIs. The packet generator 421 may generate the packet 430 by grouping information associated with a plurality of rays to be prefetched, LPIs, LTIs, an address of the local memory 470 corresponding to each of the LPIs, and an address of the local memory 470 corresponding to each of the LTIs. Also, the packet generator 421 may generate the packet 430 by grouping the prefetched information associated with the plurality of rays, data stored in the local memory 470 corresponding to each of LPIs, and data stored in the local memory 470 corresponding to each of LTIs. For example, as shown in FIG. 4, packet 430 may include four items. For example, the first item may correspond to intersection point information for HR-10 which may be stored in an address *LPI-00 of the local memory corresponding to local primitive index number "00", and in an address *LTI-00 of the local memory corresponding to local texture index number "00". The data stored in addresses *LPI-00 and *LTI-00 may correspond to "GPI-02-Data" and "GTI-01-Data" as further discussed below. Alternatively, generated packets may be grouped according to LPIs and LTIs. That is, a packet may refer to information in the local primitive index only, and a separate packet may refer to information in the local texture index only.

The converter 423 may convert a GPI and a GTI to an address of the global memory 440 based on the respective indices. As a conversion result 450, the respective global memory addresses may be indicated as "*GPI-02-Data" and "*GTI-01-Data".

A prefetcher 460 may prefetch primitive data and texture data from the global memory 440 based on the conversion result 450, and may store the prefetched primitive data and texture data in the local memory 470. The prefetcher 460 may store prefetched data in the local memory 470 by referring to the prefetch table. For example, when "GPI-02" matches "LPI-00", and when "GTI-01" matches "LTI-00", "GPI-02-Data" may be stored in "*LPI-00-Data" and "GTI-01-Data" may be stored in "*LTI-00-Data".

When a global index is received, the traversal unit 425 may verify whether a local index matching the global index is present within the prefetch table. The prefetch table represents a global index and a local index of prefetched data. When the traversal unit 425 verifies the local index, the converter 423 may convert the local index to a local memory address, and the packet generator 421 may generate the packet 430 by grouping local memory addresses. The packet generator 421 may generate the packet 430 by loading data stored in a local memory address. For example, as shown in FIG. 4, packet 430 may include four local memory addresses corresponding to four local primitive indices, and four local memory addresses corresponding to four local texture indices.

Referring to FIG. 5, a global index and a reference address of a local index match in a prefetch table.

Data, for example, "GPI-02-Data", "GPI-93-Data", "GTI-01-Data", "GTI-04-Data", and "GTI-02-Data", may correspond to data which is already prefetched for processing of a previous packet and may be already stored in a local memory. Therefore, the prefetch table may show "*LPI-00", "*LPI-01", "*LTI-00", "*LTI-01", and "*LTI-02" that match "GPI-02", "GPI-93", "GTI-01", "GTI-04", and "GTI-02", respectively.

Data, for example, "GPI-94-Data", "GPI-03-Data", and "GTI-96-Data", not processed in a previous packet may not be prefetched and thus, may need to be prefetched and then be updated to the prefetch table.

The image processing apparatus may determine, from the local memory, local indices to match "GPI-94", "GPI-03", and "GTI-96". For example, the image processing apparatus may determine that the local indices are "LPI-02", "LPI-03", and "LTI-03". As shown in block 510, the image processing apparatus may update the prefetch table by matching "GPI-94" and "GPI-03" with local addresses of the LPI index corresponding to "*LPI-02" and "*LPI-03", respectively. As shown in a block 520, the image processing apparatus may update the prefetch table by matching "GTI-96" with a local address of the LTI index corresponding to "*LTI-03".

The image processing apparatus may generate a packet using a group having a predetermined length with respect to a stream of an intersecting ray that is transferred from an intersection point estimator. The image processing apparatus may generate the packet by applying a differentiated method with respect to a stream of an intersecting ray.

The differentiated method may include at least one of ray strength of an intersecting ray, a recursion depth according to ray tracing, an amount of time used to render a current frame, and an available resource of a system.

The image processing apparatus may perform grouping based on a priority by adjusting a length of a packet or determining a priority of an intersecting ray, using the differentiated method.

Figure 6:
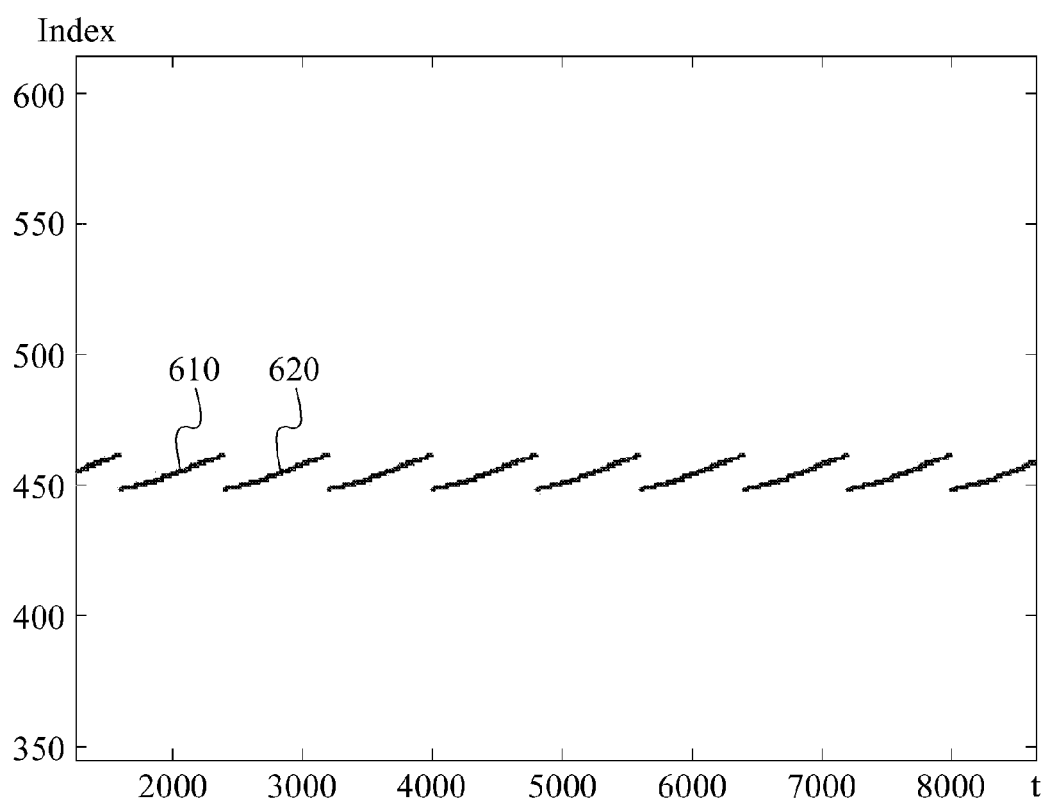
FIG. 6 and FIG. 7 are graphs illustrating a recursive pattern repeated in an image processing apparatus according to an embodiment.
Figure 7:
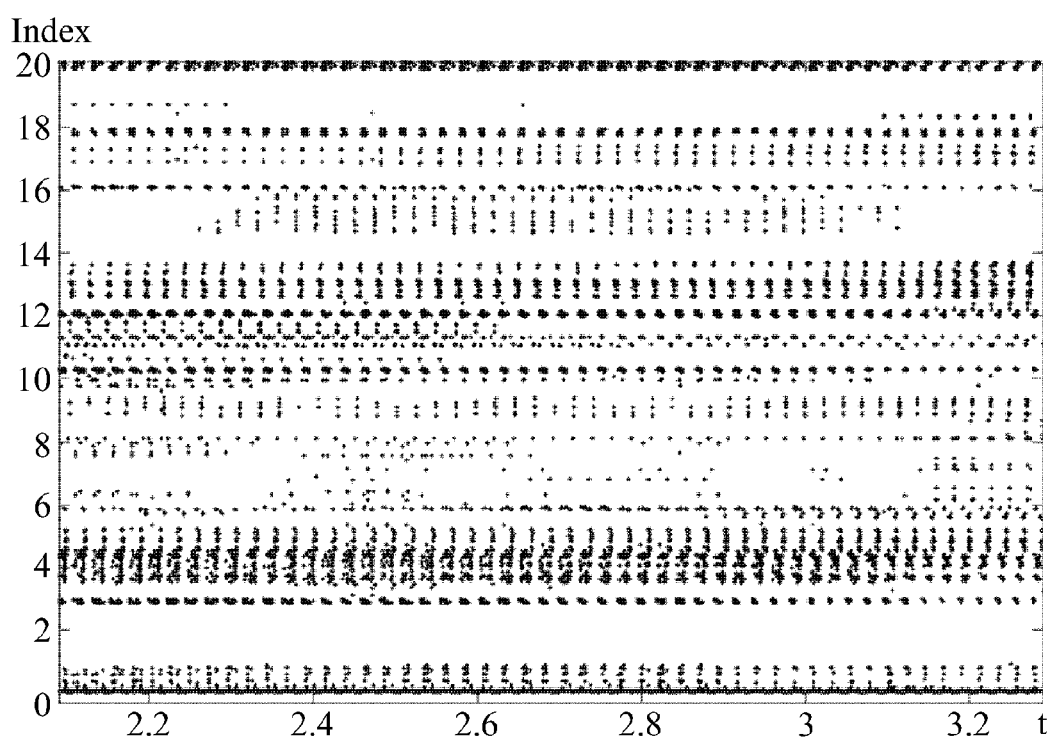

FIG. 6 and FIG. 7 are graphs illustrating a pattern repeated in an image processing apparatus according to an embodiment.

Referring to the graph of FIG. 6, as an example of a linear pattern, patterns 610 and 620 are generated around a global index 450 and are periodically repeated. Thus, it can be seen from FIG. 6 that a limited number of global indices may be repeatedly accessed on a periodic basis, which may be predictable.

Referring to the graph of FIG. 7, as an example of a scatter pattern, patterns having various indices are periodically repeated.

When recursion of a pattern is detected, the image processing apparatus may obtain rendering information of a local memory that is prefetched from a local index matching a global index, and may transfer the rendering information to a shader that performs an SRG process.

Figure 8:
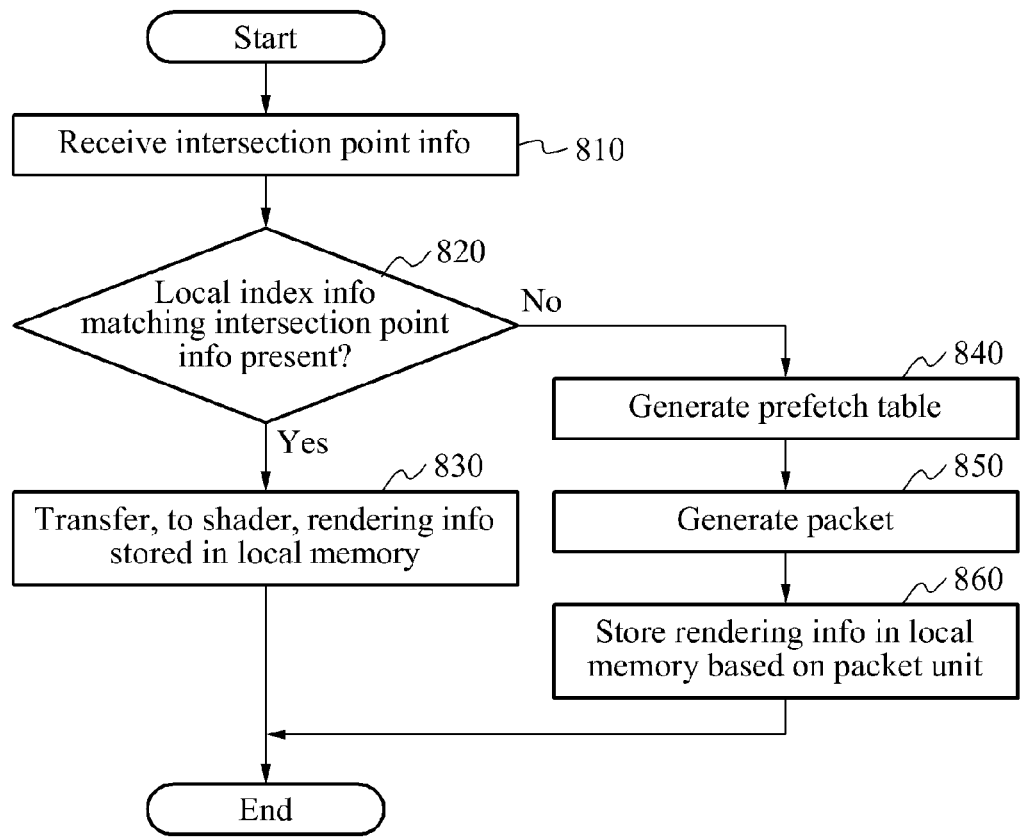
FIG. 8 illustrates an image processing method according to an embodiment.

FIG. 8 illustrates an image processing method according to an embodiment.

In operation 810, an image processing apparatus may receive intersection point information of a ray.

In operation 820, the image processing apparatus may verify or determine whether local index information matching intersection point information is present within a prefetch table. The image processing apparatus may verify or determine whether global index information of a point at which the ray and a polygon of an object intersect and local index information already matches in the prefetch table.

In operation 830, when local index information matching intersection point information is present, the image processing apparatus may transfer, to a shader, rendering information stored in a local memory based on the local index information. The image processing apparatus may calculate a local memory address based on the local index information. The image processing apparatus may also transfer the local memory address to the shader, and may also transfer, to the shader, rendering information stored in the local memory address. Alternatively, the shader may receive local index information of the local memory that stores the rendering information and the shader may retrieve the rendering information by accessing the local memory using the local index information.

In operation 840, when local index information matching intersection point information is absent, the image processing apparatus may generate a prefetch table in which global index information and local index information of the local memory storing rendering information prefetched from a global memory matches.

The image processing apparatus may update the prefetch table with new global index information not reflected in the prefetch table and new local index information matching the new global index information.

In operation 850, the image processing apparatus may generate a packet including local index information matching intersection point information for the respective rays intersecting a polygon of an object. The packet may include a plurality of items of local index information. The packet may include a plurality of local memory addresses. The packet may also include a plurality of items of rendering information stored in the plurality of local memory addresses.

In operation 860, the image processing apparatus may store, in the local memory, rendering information stored in the global memory based on a packet unit. That is, the image processing apparatus may prefetch rendering information from the global memory in advance, and then store that rendering information in the local memory.

The image processing apparatus may convert global index information corresponding to the intersection point information to a global memory address of a global memory, and may convert, to a local memory address, local index information that matches the global index information in the prefetch table.

The image processing apparatus may prefetch, to the local memory address of the local memory, rendering information stored in the global memory address of the global memory.

In FIG. 8, rendering information which is stored in the local memory based on a packet unit in operation 860 may also be transferred or accessed by the shader for the shader to perform an SRG process.

One of ordinary skill in the art would understand that upon an initial determination that some of the local index information matches some of the intersection point information in the prefetch table, that rendering information may be immediately transferred from the local memory to the shader, or immediately accessed by the shader. Alternatively, one of ordinary skill in the art would understand that the prefetch table may be updated to determine, from the local memory, local indices which match the intersection point information, and the image processing apparatus may prefetch, to the local memory addresses of the local memory corresponding to the local indices, rendering information stored in the global memory address of the global memory. Once the prefetch table is updated, a packet may be generated and rendering information corresponding to the intersection point information may be transferred from the local memory to the shader or accessed by the shader.

According to embodiments, an image processing apparatus may decrease an amount of time used for data loading and prevent a stall of a processor occurring due to latency of data loading by obtaining data prefetched to a local memory using intersection point information and a prefetch table.

Also, according to embodiments, an image processing apparatus may prevent an access of data of a global memory from being concentrated and also prevent degradation in performance of a system from occurring due to an access collision by obtaining data prefetched to a local memory using intersection point information and a prefetch table.

Also, according to embodiments, an image processing apparatus may generate a packet and perform prefetching based on a packet unit to enhance efficiency of data prefetching.

Also, according to embodiments, an image processing apparatus may enhance data access efficiency by enabling data which is prefetched based on a packet unit to be accessible in a local memory.

The apparatus and methods used to perform image processing according to the above-described example embodiments may use one or more processors, which may include a microprocessor, central processing unit (CPU), digital signal processor (DSP), or application-specific integrated circuit (ASIC), as well as portions or combinations of these and other processing devices.

The terms "module", and "unit," as used herein, may refer to, but are not limited to, a software or hardware component or device, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Each block of the flowchart illustrations may represent a unit, module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The image processing apparatus and image processing method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made to these embodiments without departing from the principles and spirit of the disclosure, the scope of which is defined by the claims and their equivalents.

What is claimed is:

1. An image processing apparatus, comprising:
a traversal processor configured to verify whether a prefetch table includes local index information matching intersection point information of a ray; and
a controller, configured to transfer, to a shader, rendering information stored in a local memory based on the local index information, in response to the prefetch table including local index information matching the intersection point information.

2. The image processing apparatus of claim 1, wherein the traversal processor verifies whether the prefetch table includes local index information matching global index information of a point at which the ray and a polygon of an object intersect.

3. The image processing apparatus of claim 2, wherein the controller comprises:
a table generator processor configured to generate the prefetch table in which the global index information and the local index information matches; and
a table updater processor configured to update the prefetch table,
wherein the local index information indicates an index of the local memory that stores rendering information prefetched from a global memory based on the global index information.

4. The image processing apparatus of claim 1, wherein the controller comprises:
a packet generator processor configured to generate a packet comprising at least one of local index information matching intersection point information for respective rays intersecting a polygon of an object and local memory addresses corresponding to the local index information.

5. The image processing apparatus of claim 4, wherein the local memory stores rendering information prefetched from a global memory to a local memory address of the local memory for the respective packets.

6. The image processing apparatus of claim 4, wherein a size of the packet is determined based on a size of the local memory and a hit rate of the ray.

7. The image processing apparatus of claim 1, wherein the controller comprises:
a converter processor configured to convert global index information corresponding to the intersection point information to a global memory address of a global memory, and to convert, to a local memory address of the local memory, local index information that matches the global index information in the prefetch table; and
a prefetcher processor configured to prefetch, to the local memory address of the local memory, rendering information stored in the global memory address of the global memory.

8. The image processing apparatus of claim 1, wherein a size of the prefetch table is determined based on a size of the local memory and a hit rate between the ray and a polygon of an object.

9. The image processing apparatus of claim 1, wherein the controller adjusts a size of a packet comprising local index information, based on a recursive pattern of global index information.

10. The image processing apparatus of claim 1, wherein the local memory stores primitive information and texture information matching local index information for respective packets comprising local index information.

11. The image processing apparatus of claim 1, wherein when the local index information matching the intersection point information is present, the controller transfers, to the shader, the local index information and a local memory address corresponding to the local index information.

12. An image processing method, comprising:
verifying, using a processor, whether a prefetch table includes local index information matching intersection point information of a ray; and
transferring, from the processor to a shader, rendering information stored in a local memory based on the local index information in response to the prefetch table including local index information matching the intersection point information.

13. The method of claim 12, wherein the verifying comprises verifying whether the prefetch table includes local index information matching global index information of a point at which the ray and a polygon of an object intersect.

14. The method of claim 13, further comprising:
generating, using the processor, the prefetch table in which the global index information and the local index information of the local memory storing rendering information prefetched from a global memory matches; and
updating, using the processor, the prefetch table.

15. The method of claim 12, further comprising:
generating, using the processor, a packet comprising local index information matching intersection point information for respective rays intersecting a polygon of an object.

16. The method of claim 12, further comprising:
converting, using the processor, global index information corresponding to the intersection point information to a global memory address of a global memory, and converting, to a local memory address of the local memory, local index information that matches the global index information in the prefetch table; and
prefetching, using the processor, to the local memory address of the local memory, rendering information stored in the global memory address of the global memory.

17. An image processing method, comprising:
determining, using the processor, whether rendering information corresponding to intersection point information of a ray is stored in a local memory, by referring to a prefetch table;
transferring, using the processor, rendering information stored in the local memory in response to the prefetch table indicating at least some rendering information corresponding to the intersection point information is stored in the local memory;
prefetching, using the processor, from a global memory to the local memory rendering information corresponding to the intersection point information when the prefetch table indicates at least some rendering information corresponding to the intersection point information is not stored in the local memory; and
updating, using the processor, the prefetch table to reflect that the local memory stores the rendering information prefetched from the global memory.

18. The method of claim 17, wherein the referring to the prefetch table comprises:
verifying whether a global index associated with the intersection point information matches a reference address of a local index corresponding to the local memory.

19. The method of claim 17, further comprising:
generating, using the processor, a packet comprising local index information corresponding to the prefetched rendering information.

20. The method of claim 19, wherein the packet is generated by grouping a plurality of items according to a local index type.

21. The method of claim 19, wherein a size of the generated packet is determined according to a differentiated method using at least one of a ray strength of an intersecting ray, a recursion depth according to ray tracing, an amount of time used to render a current frame, and an available resource of a system.

* * * * *